US006187246B1

(12) United States Patent
Reiland et al.

(10) Patent No.: US 6,187,246 B1
(45) Date of Patent: Feb. 13, 2001

(54) METHOD OF MANUFACTURING AN EXTENDED HEIGHT INSULATIVE HOUSING FOR AN ELECTRICAL CONNECTOR

(75) Inventors: Keith F. Reiland, Dubois; Patrick F. Tekely, Ramey, both of PA (US)

(73) Assignee: Berg Technology, Inc., Reno, NV (US)

( * ) Notice: Under 35 U.S.C. 154(b), the term of this patent shall be extended for 0 days.

(21) Appl. No.: 09/224,383

(22) Filed: Dec. 31, 1998

(51) Int. Cl.[7] .......... B29C 45/36
(52) U.S. Cl. .......... 264/328.1; 264/328.12
(58) Field of Search .......... 264/328.1, 328.12

(56) References Cited

U.S. PATENT DOCUMENTS 4,725,243 * 2/1988 Pretchel et al. .......... 439/395
4,767,352 * 8/1988 Pretchel .......... 439/395
4,795,374 1/1989 Rishworth et al. .
4,871,318 * 10/1989 Gobets et al. .......... 439/76
5,595,490 1/1997 Cohen et al. .
5,652,185 * 7/1997 Lee .......... 437/219
5,772,474 6/1998 Yagi et al. .
5,779,505 7/1998 Yagi et al. .
5,824,257 * 10/1998 Dashevsky et al. .......... 264/328.1

OTHER PUBLICATIONS

Rosato, Donald V., et al., Injection Molding Handbook, second edition, pp. 227–233, 581–595, 655–657, 1995.*
Tadmor et al, Principles of Polymer Processing, John Wiley & Sons, pp. 590–610, 1979.*

* cited by examiner

*Primary Examiner*—Jill L. Heitbrink
(74) *Attorney, Agent, or Firm*—Perman & Green, LLP

(57) ABSTRACT

An improved method for molding an elongated insulative housing having an extended height insulative housing which reduces the tendency of the housing to warp or bow during molding is disclosed. The improved combined steps of this invention comprise injecting a molding compound in a mold cavity having opposed, inwardly directed, tapered fingers providing a transverse flow restriction in the mold cavity, allowing the molding compound to cure and then removing the housing from the mold cavity.

24 Claims, 5 Drawing Sheets

METHOD OF MANUFACTURING AN EXTENDED HEIGHT INSULATIVE HOUSING FOR AN ELECTRICAL CONNECTOR

CROSS REFERENCE TO RELATED APPLICATIONS

This application is related to application Ser. No. 09/224,142 entitled "ELECTRICAL CONNECTOR WITH TERMINAL LOCATION CONTROL FEATURE" and to application Ser. No. 09/224,140 entitled "PRESS FIT SCA CONNECTOR" both filed on Dec. 31, 1998 and which are incorporated herein by reference.

BACKGROUND OF THE INVENTION

1. Field of the Invention

The present application relates to electrical connectors and more particularly to methods for manufacturing electrical connectors.

2. Brief Description of Prior Developments

In various electrical connectors particular needs require the use of relatively long beams. The physical relationship of the cross sectional area of the beam and its length will make it difficult to manage more critical dimensional tolerances. The critical dimensional tolerances in question control the inner relationship between the terminal tail, the retention feature and the contact area of the terminal. An example of such an electrical connector is a receptacle used on a single connect attach (SCA) disk drive interface.

There is, therefore, a need for means for managing critical tolerances in connectors having such cross sectional area to length relationships.

It is also known that the use of a relatively long beam will generally require the use of a relatively high insulative housing. It is found, however, that such extended height insulative housings or other atypical height to width ratio housings may have a tendency to bow or warp during molding.

There is, therefore, a need for a method of molding extended height insulative housings.

SUMMARY OF THE INVENTION

The present invention is a receptacle for an electrical connector which comprises an elongated insulative housing having parallel lateral walls, parallel end walls and base wall. An interior cavity is formed by those walls, and a longitudinal groove extends between the longitudinal walls from adjacent one of said end walls to the other end wall. At least one conductive contact having a base end and a distal end extends upwardly in the interior cavity. It is fixed to the housing adjacent the base end and is attached at a medial guide means and then extends upwardly such that the distal end of the contact is adjacent the longitudinal groove.

Also encompassed by the present invention is a method for molding an insulative housing for an extended height housings in which a transverse flow restriction means is provided to eliminate or reduce bow and warp in the housing.

BRIEF DESCRIPTION OF THE DRAWINGS

The connector of the present invention is further described with reference to the accompanying drawings in which.

DETAILED DESCRIPTION OF THE PREFERRED EMBODIMENTS

Figure 1:
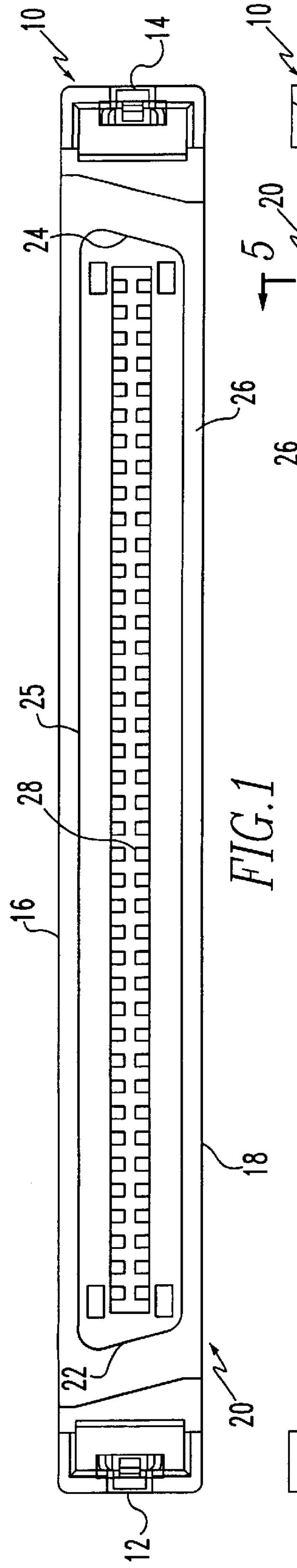
FIG. 1 is a top plan view of a preferred embodiment of the connector of the present invention.

Referring to FIGS. 1–6, the receptacle of the present invention includes an insulative housing shown generally at numeral 10. This housing has a first end wall 12 and a second end wall 14 which are connected by a first lateral wall 16 and a second lateral wall 18. The housing also includes an upper plug receiving structure shown generally at numeral 20. This upper receiving structure is made up of a first end wall extension 22 and a second end wall extension 24 which are connected by a first lateral wall extension 25 and a second lateral wall extension 26 that form a medial plug receiving channel 28. The housing also includes a base wall 30 with attachment brackets 32 and 34 and a positioning peg 36. Adjacent the first and second end walls 12 an 14 there are respectively ground springs 38 and 40.

Referring particularly to FIGS. 5–8, an interior cavity 42 is formed between the first lateral wall 16 and the lateral wall 18 and beneath the plug receiving channel 28. Inside this cavity and between the exterior lateral walls there is a medial interior longitudinal wall 44 which separates the interior cavity 42 into a first terminal containing section 45 and a second terminal containing section 46.

Extending into the first terminal containing section 45 from the medial interior longitudinal wall 44 there is an outward longitudinal wall protrusion 47. Extending into the second terminal containing section 46 from the medial interior longitudinal wall 44 there is a second outward longitudinal wall protrusion 48. Extending from the second lateral wall into the first terminal containing section 45 there is an inward longitudinal protrusion 49. Terminal conveying openings are formed respectively in terminal containing section 45 between wall 18 and protrusion 49 and protrusion 47. In terminal retaining section 46 a similar space is formed between longitudinal protrusion 48 and wall 16. In this terminal conveying space there are respectively in retaining sections 45 and 46 widened upper sections 50 and 51, widened and lower sections 52 and 53, and narrow medial terminal retaining sections 54 and 55. In the first and second terminal retaining sections 45 and 46 there are respectively a first terminal 56 and a second terminal 57. These terminals extend through the base wall respectively in a first base wall aperture 58 and a second base wall aperture 59. The first and second terminals 56 and 57 also have respectively a first lower terminal section 60 and a second lower terminal section 61. The first and second terminals 56 and 57 also have respectively a first attachment section 62 and a second attachment section 63 which are connected at the housing at lower connection point 64 and lower connection point 65 by means of barbs as at barb 66 (FIG. 8) which cut into the plastic of the housing. The first and second terminals 56 and 57 also have lateral bends 67 and 68 from where they extend respectively from the widened lower sections 52 and 53 to the narrow medial retaining sections 54 and 55.

In these sections there are respectively a first terminal 56 and a second terminal 57. In the base wall 30 there is a first base wall terminal aperture 58 and a second base wall aperture 59. Extending outwardly from these apertures there are respectively a lower terminal section 60 of the first terminal 56 and a lower terminal section 60 of the second terminal 57. The first terminal 56 and the second terminal 57 also have respectively lower attachment sections 62 and 63, which are fixed to the housing at lower connection points 64 and 65 respectively. The attachment sections 64 and 65 have barbs as at barb 66 (FIG. 8) which cut into the plastic in the housing at the connection points 64 and 65. The first and second terminals also include lateral bend sections 67 and 68 and interior vertical sections 70 and 72. The first and second terminals also include, respectively, upper wing sections 74 and 76 to where they are movably retained on the housing, respectively, at the first and second medial guide sections 54 and 55. Adjacent their distal ends, the first and second terminals 56 and 57 have respectively first and second contacts 78 and 80. From the medial guide section 54 and 55 the first terminal 56 and second terminal 57 extend inwardly to the contacts 78 and 80 in sections 82 and 84 respectively. These inward sections 82 and 84 have distal outward bend sections 86 and 88 respectively. The housing also includes a plurality of side cores as at cores 90 and 91 for advantages in molding the receptacle.

It will be appreciated that control of critical dimensional tolerances in the terminals, such as distances between the contact points 78 and 80, will be improved by virtue of the fact that they are movably retained in the medial guide positions 54 and 55.

The receptacle described herein may be advantageously used on a single connect attach (SCA) disk drive interface.

Figure 2:
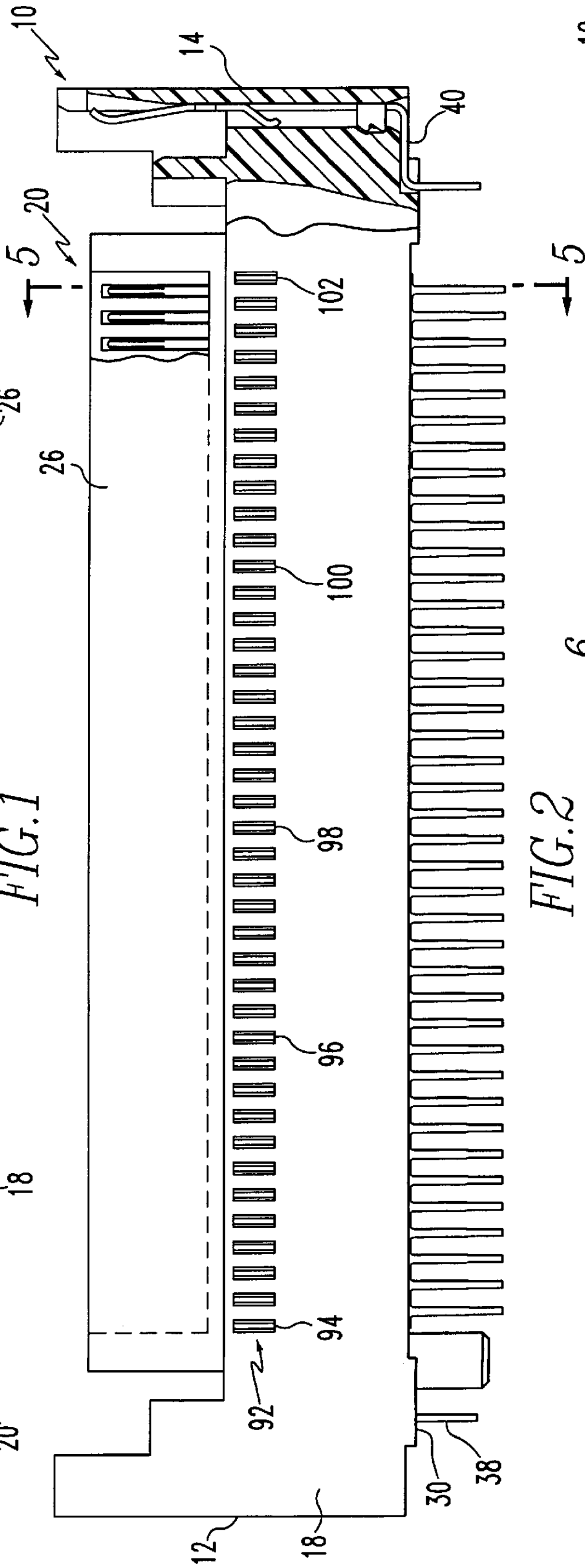
FIG. 2 is a side elevational view of the connector shown in FIG. 1.
Figure 3:
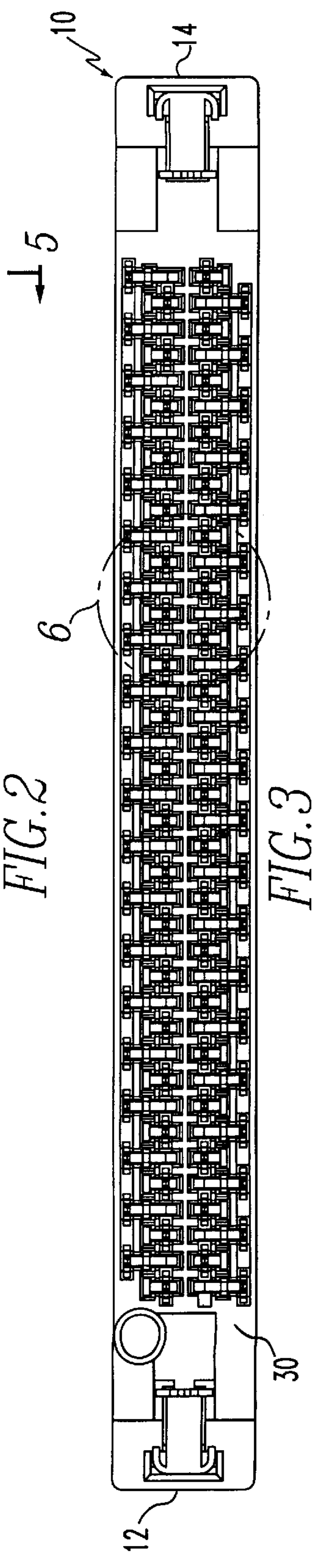
FIG. 3 is a bottom plan view of the connector shown in FIG. 1.
Figure 4:
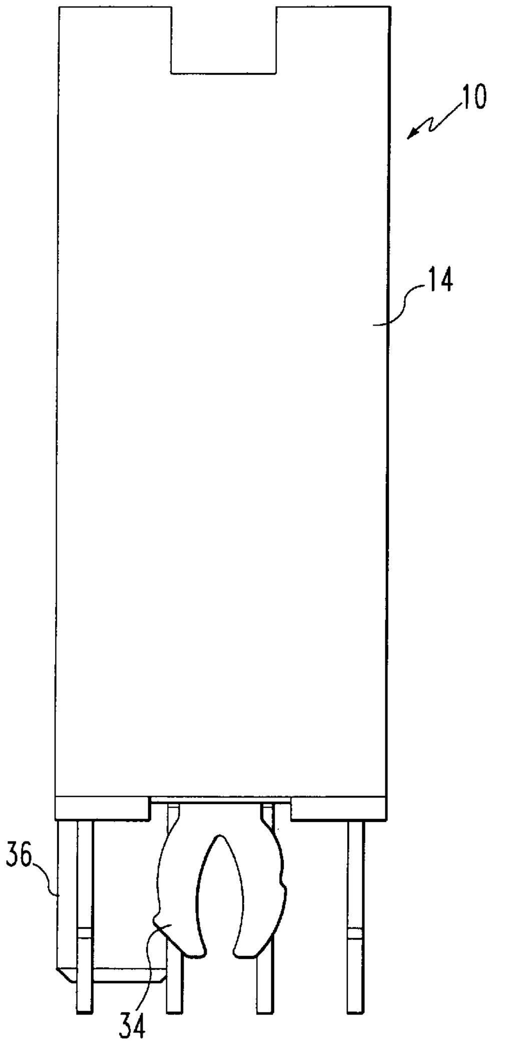
FIG. 4 is an end view of the connector shown in FIG. 1.
Figure 5:
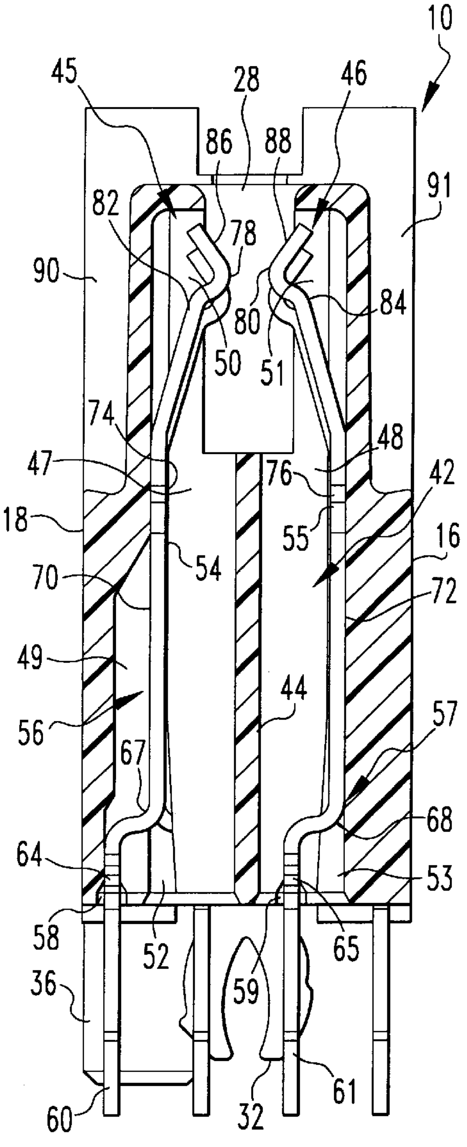
FIG. 5 is a cross sectional view through 5—5 in FIG. 2.
Figure 6:
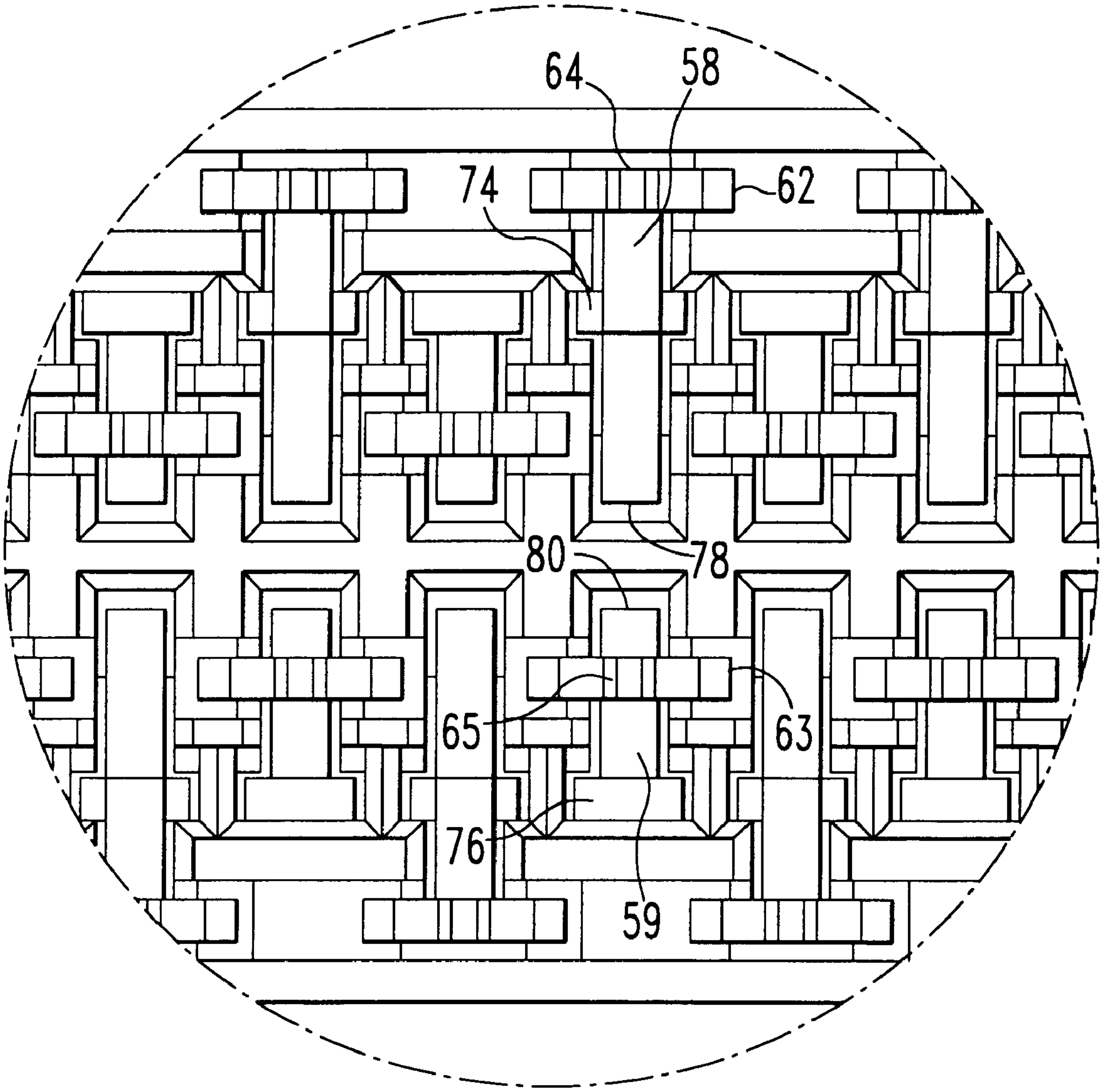
FIG. 6 is a detailed view of the area in circle 6 in FIG. 3.
Figure 7:
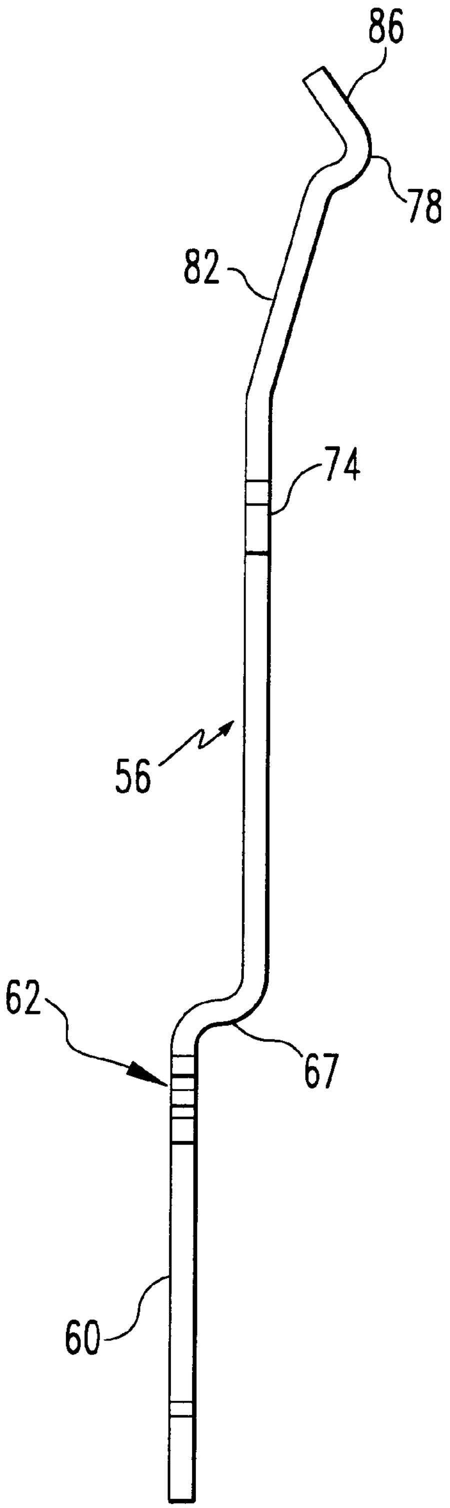
FIG. 7 is a side view of the terminal used in the connector shown in FIG. 1.
Figure 8:
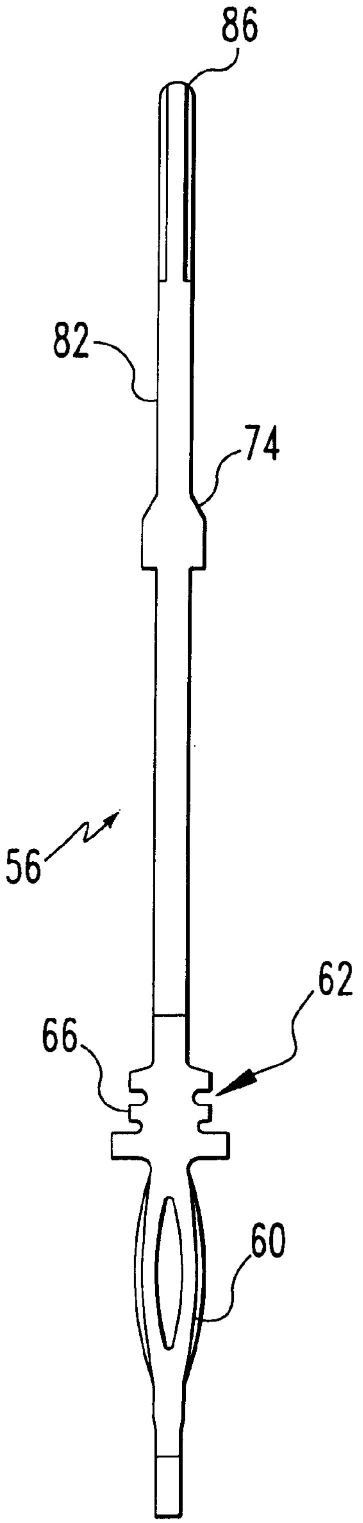
FIG. 8 is a front view of the terminal shown in FIG. 7.

It will be appreciated that the housing of the connector described above is of an extended height. Encompassed by this invention is a way of avoiding bow and warp in the molding of the insulative housing which has been a problem experienced in molding of prior art extended height housing. It has been found that such bow and warp may be eliminated or reduced by positioning one or more medial transverse restrictions in the mold during the molding process. Referring particularly to FIG. 2, it will be seen that on a second lateral wall 18 there is a row of vertically elongated apertures shown generally at numeral 92. This row includes, for example, apertures 94, 96, 98, 100 and 102. Although not shown, it will be understood that there is a similar row of apertures on the first lateral wall 16.

Figure 9:
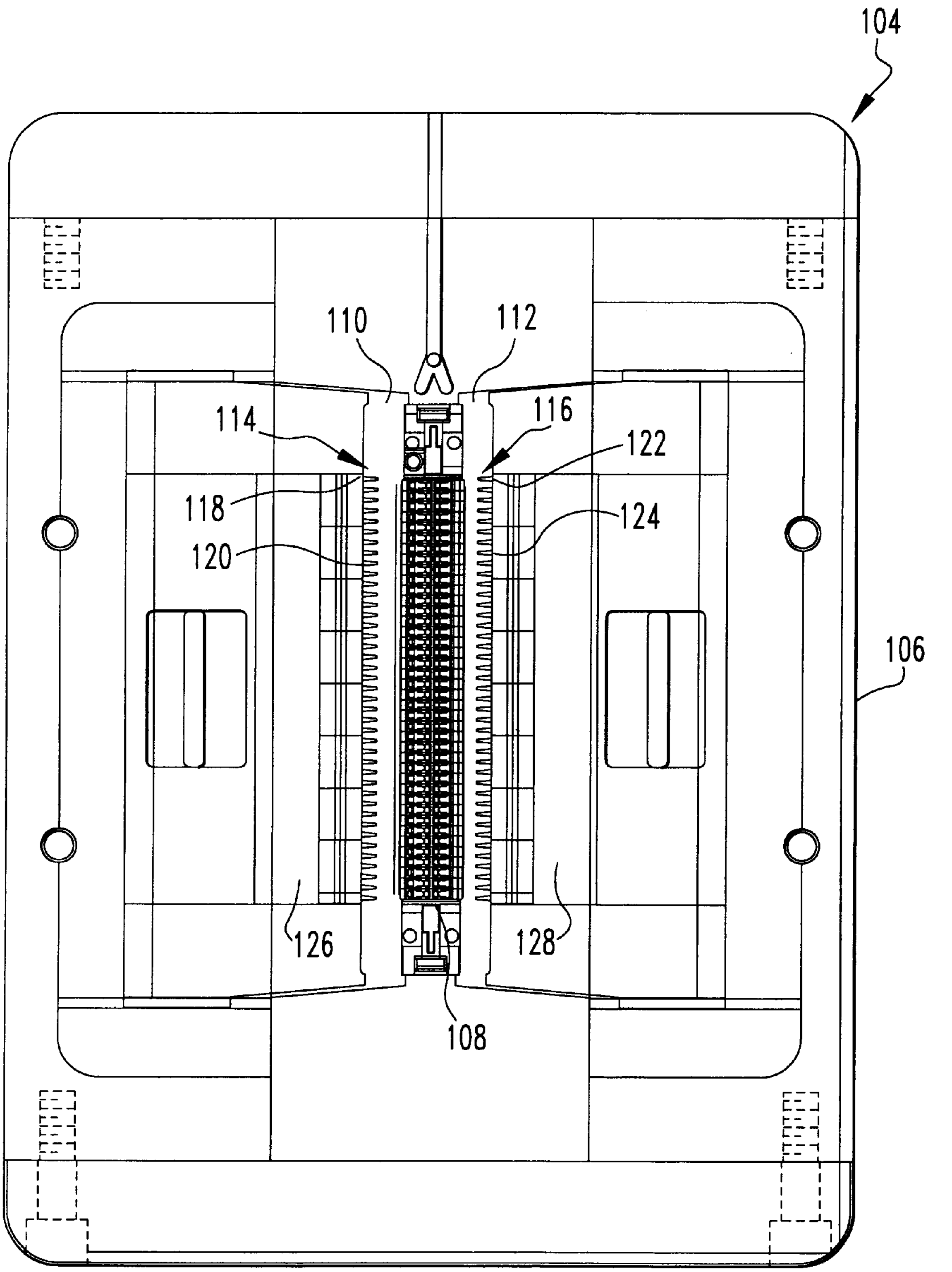
FIG. 9 is the bottom section of a mold used in the manufacture of the insulative housing used in the connector shown in FIG. 1.

Referring to FIG. 9, the lower section of the mold used in the manufacture of the insulative housing described above is shown generally at numeral 104. As is conventional, this section of the mold includes a main chase body 106 and a main core body 108. On the opposed longitudinal sides there are finger supports 110 and 112 from which there are respectively opposed rows of inwardly projecting tapered core fingers shown generally at numerals 114 and 116. These rows 114 and 116 include a plurality of tapered core fingers as, for example, fingers 118 and 120 in row 114 and fingers 122 and 124 in row 116. Outwardly from supports 114 and 116 there are respectively cams 126 and 128. These cams rotate to move supports 114 and 116 inwardly until the fingers on support 114 contacts an opposed finger on support 116. Each of these fingers forms a traverse restriction in the mold cavity. These transverse restrictions act as flow diverters for the molding compound to decrease the potential for bow and warp in the completed insulative housing. These opposed fingers also form the apertures in the lateral walls of the insulative housing. For example, finger 118 on support 114 and finger 122 on support 116 form aperture 94 on lateral wall 18 and an opposed aperture (not shown) on lateral wall 16. As a further example, finger 120 on support 114 and finger 124 on support 116 form aperture 96 on lateral wall 18 and an opposed aperture (not shown) on lateral wall 16. The other apertures as at apertures 98, 100 and 102 on lateral wall 18 and the aperture (not shown) on lateral wall 16 are formed in the same way.

EXAMPLE

In the way described above, an extended height insulative housing for a connector was molded from DUPONT polymer HTN FR5G35L which is a 35% by weight fiberglass glass filled nylon. The furnished housing had a length of 69 mm and a height of 15.85 mm. The finished part was inspected for part warpage and was found to be within generally accepted product specifications.

From the above example, it will be appreciated that the height to length ratio of the completed insulative housing was about 0.23:1.0. it is believed that this method may be advantageously employed in height to length ratios of at least about 0.20:1.0 to about 0.25:1.0. it is also believed that the method may be advantageously employed when fiberglass reinforcement is used in a range of at least about 30% to about 40% by weight.

It will be appreciated that the above described method for molding an insulative housing is applicable not only to the specific housing described herein but to any extended height insulative housing or any insulative housing having a high height to length ratio.

It will be appreciated that a long beam connector has been described that allows for critical dimension tolerances, particularly relative to the positioning of the terminal contacts either relative to each other or relative to some other feature. It will also be appreciated that a method has been described which decreases the potential for bow and warp in an extended height housing for an electrical connector or for any such insulative housing having a high height to length ratio.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for molding an elongated insulative housing comprising the steps of:

injecting a molding compound in a mold cavity, having opposed, inwardly directed, tapered fingers;

allowing the molding compound to cure; and removing the housing from the mold cavity;

wherein the fingers provide a transverse mold flow restriction to reduce the tendency of the housing to bow or warp.

2. The method of claim 1 wherein said fingers comprise rows of opposed, inwardly directed, tapered fingers.

3. The method of claim 2 wherein the housing is an extended height housing.

4. The method of claim 1 wherein the molding compound is a reinforced polymer.

5. The method of claim 4 wherein the molding compound is a fiberglass reinforced polymer.

6. The method of claim 5 wherein the molding compound is from about 30% to about 40% by weight fiberglass.

7. The method of claim 6 wherein the molding compound is about 35% by weight fiberglass.

8. The method of claim 6 wherein the polymer is nylon.

9. The method of claim 1 wherein the molding compound is nylon.

10. The method of claim 8 wherein the nylon is reinforced.

11. The method of claim 8 wherein the nylon is reinforced with fiberglass.

12. The method of claim 10 wherein the molding compound is from about 30% to about 40% by weight fiberglass.

13. The method of claim 12 wherein the molding compound is about 35% by weight fiberglass.

14. The method of claim 1 wherein the insulative housing has a height and a length and the ratio of the housing is from about 0.20:1.0 to about 0.25:1.0.

15. The method of claim 14 wherein the ratio of the height to the length of the housing is about 0.23:1.

16. The method of claim 4 wherein the insulative housing has a height and a length and the ratio of the housing is from about 0.20:1.0 to about 0.25:1.0.

17. The method of claim 16 wherein the ratio of the height to the length of the housing is about 0.23:1.

18. The method of claim 9 wherein the insulative housing has a height and a length and the ratio of the housing is from about 0.20:1.0 to about 0.25:1.0.

19. The method of claim 18 wherein the ratio of the height to the length of the housing is about 0.23:1.

20. The method as recited in claim 1, wherein said mold cavity further comprises features which produce sections in said housing for receiving terminals, said fingers positioned between adjacent features.

21. The method as recited in claim 1, wherein a row of fingers reside on each side of said mold cavity.

22. The method as recited in claim 1, further comprising the step of biasing said fingers into position in said mold cavity.

23. The method as recited in claim 22, wherein the biasing step comprises the step of camming said fingers into position in said mold cavity.

24. A method of making a housing for an electrical connector, comprising the steps of:

providing a mold having an alternating arrangement of features which produce sections in said housing for subsequently receiving terminals and inwardly directed fingers;

injecting a molding compound in said mold;

allowing the molding compound to cure; and removing the housing from said mold;

wherein said fingers provide a transverse mold flow restriction to reduce the tendency of the housing to bow or wrap.

* * * * *